Sept. 29, 1970  J. KAISER  3,531,622
ELECTRIC FLOW HEATER
Filed May 9, 1966  4 Sheets-Sheet 3

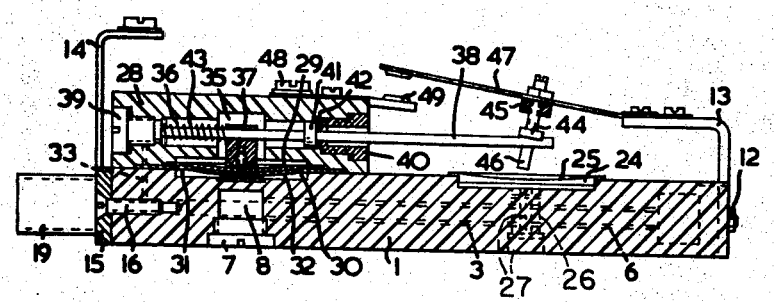

United States Patent Office 3,531,622
Patented Sept. 29, 1970

3,531,622
ELECTRIC FLOW HEATER
Josef Kaiser, Reid, Innkreis, Vogelweg 24, Austria
Filed May 9, 1966, Ser. No. 548,461
Int. Cl. H05b 1/02; G01k 13/02
U.S. Cl. 219—309         5 Claims

ABSTRACT OF THE DISCLOSURE

A continuous flow hot water heater has a block of insulating material with intermediate passageways for water and resistance heating wire coils in some parts of the passageways. A constriction in one of the passageways causes a pressure drop when water flows; this drop actuates a diaphragm housing which operates to switch current on. This same switch is operated by a temperature responsive element containing material such as ethylene dichloride. This element is in contact with the water and expands to switch off current when predetermined temperature is reached and thus acts as a temperature thermostat. The diaphragm is sandwiched between one portion of a major block face towards one end of a diaphragm housing, diaphragm housing provides the fixed contacts and the switch operating bar is a two-arm rocker lever which extends from inside the diaphragm housing along the uncovered portion of the major face of the insulating block where it operated the switch. The oven temperature thermostat is also accommodated on this face of the insulating block resulting in all the operation taking place in a compact space at one side of the insulating block face. Preferably the switch does not control the current to the heater coils directly but instead operates a contactor which in turn performs the high power switching required for the heating element. A single block with coils adapted for heating by three phase current is also shown.

Flow heaters of this kind have the important advantage that they enable an accommodation of resistance coils having a relatively high power rating within a relatively small space and that they have only a very small liquid volume so that heated fresh water from the supply line is virtually immediately available after the shut-off valve has been opened, which precedes the flow heater in most cases. The ducts positively conduct the water past the resistance coils so that a uniform transfer of heat from said coils is ensured. For a satisfactory operation, such flow heaters must be energized only when the flow rate is in view of the actual heating power to avoid a temperature of the outflowing liquid in excess of a predetermined value, which is in most cases about 70° C. Otherwise there may be a deposition of boiler scale on the resistance conductors, and a formation of steam or even a blowing of the resistance conductors. The diaphragm provided in flow heaters of the kind defined initially hereinbefore is set to a certain differential pressure, which is proportional to the minimum liquid flow rate required, so that the diaphragm does not close the switch until a predetermined differential pressure has been exceeded and causes the switch to remain open or to open when the differential perssure is or falls below said value. In the case of a wrong operation of the switch or when the supplied water contains occluded gas in such an amount that a sufficient dissipation of heat at the resistance conductors is no longer ensured, the temperature-responsive control element operates to prevent in order defects and damage. In flow heaters of the kind defined first hereinbefore, the temperature-responsive control element comprises in most cases a bimetal switch. This bimetal switch has such a slow response that it cannot prevent damage in practice. It has also been suggested to make the control diaphragm also from bimetal. This results in a very stiff diaphragm, which is highly susceptible to fatigue so that it can no longer perform the switching operations satisfactorily. In most cases, the switching movement of the diaphragm is derived by a feeler pin, which extends substantially at right angles to the diaphragm and is slidable in its longitudinal direction and extends outwardly to the switch through a lead-out, which is similar to a stuffing-box and carried by the diaphragm housing. This kind of lead-out has the important disadvantage that the friction forces which act on the feeler in the stuffing-box and obstruct the movement of the feeler cannot be exactly ascertained and may even vary during operation so that a sensitive control appears to be impossible. As the feeler engages the diaphragm in a point, damage and a fatigue of the material result and have also an adverse effect on the reliability of the control. To ensure nevertheless a troublefree operation during a prolonged time, the switch is set so that there is a safety clearance when defects occur. Whereas it would be possible without damage to the heater to use liquid outlet temperatures of about 70° C., the switch setting is selected so that the normal operating temperature is only about 50° C. so that minor defects do not result in overheating. In this case, the outlet temperature which can be achieved is too low for many applications. The control diaphragm is accommodated in a separate metal housing, which is mounted on the block of insulating material. This is highly expensive and the installing of the heater is rendered more difficult because there must be connections to both sides of the diaphragm.

The main object of the invention resides in the provision of a flow heater which is suitable for permanent operation at high operating temperatures without danger of blowing or overheating.

It is another object of the invention so to design the flow heater that full safety of operation is maintained even when the heater is operated with liquids that are not entirely pure or contain occluded gas bubbles.

A further object of the invention is to provide a flow heater in which any repairs which may become necessary can be carried out in a quick and convenient manner by a replacement of individual components.

According to a still further object of the invention the power output of the heater windings should be adaptable at least in steps to the actual flow rate.

It is another object of the invention to provide a heater which is so designed that the flow ducts can be emptied and filled quickly and simply so that the heater can be protected in a very simple manner from damage by freezing and from being started when its flow ducts are air-filled.

These and further objects are accomplished by the flow heater designed according to the invention, which is characterized in that the diaphragm actuates the switch by means of one two-armed rocker lever, which extends laterally out of the housing for the diaphragm, and the temperature-responsible control element acts on the same switch independently of the diaphragm. Thus, the flow heater according to the invention requires only a single switch, which has a dual function.

According to the invention, the diaphragm is disposed over a recess in the block of insulating material and is covered by a further insulating body, which has a recess facing the diaphragm, is detachably secured to the block of insulating material, and has a top portion that constitutes a carrier for the switch contacts. Further, the temperature-responsive control element consists of a liquid thermostat, has a boiling point near the cut-out temperature so that the switch is opened when the desired cut-out temperature is reached.

Further details and advantages of the invention will become apparent from the subsequent description of the drawing, which shows an embodiment of the invention by way of example.

FIG. 1 is a longitudinal sectional view showing a flow heater with the housing removed.

FIG. 2 is a horizontal sectional view showing the insulating body on a smaller scale.

FIG. 3 is a horizontal sectional view showing the block of insulating material of the flow heater of FIG. 1.

FIG. 4 is a horizontal sectional view showing the block of insulating material of a flow heater for operation with three-phase A.C.

FIG. 10 shows a schematic wiring diagram of the heating element, control switch and contactor type power switch.

Figure 5:
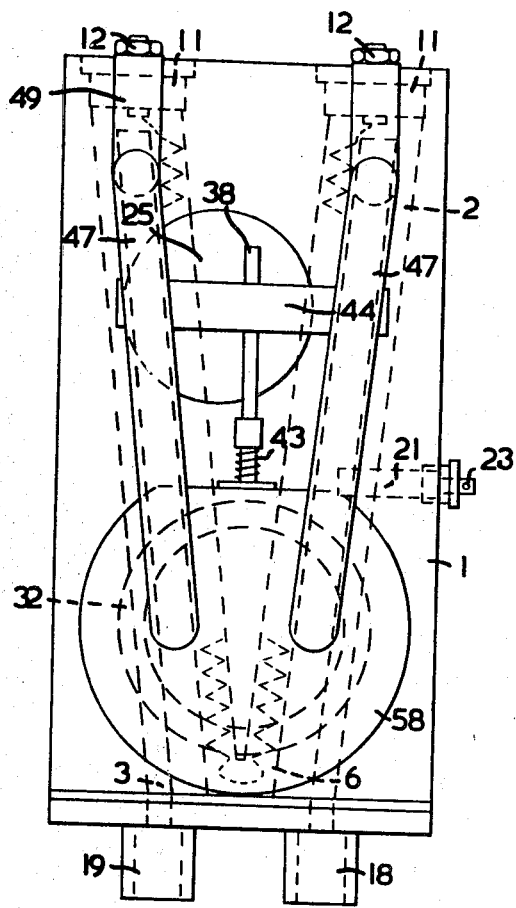
FIG. 5 is a top plan view showing a modification of the flow heater of FIG. 1.

The flow heater shown in FIGS. 1 to 3 comprises a block 1 of insulating material in the form of a flat, rectangular prism. This block has an inlet duct 2 and an outlet duct 3, which extend in the longitudinal direction of block 1, and further has two ducts 4, 6, which converge in V-shape from the ends of the ducts 2, 3. A helix of bare resistance wire 5 is accommodated in said ducts and forms a resistance coil. The intersection of the two ducts 4, 6 is accessible from the underside of the block through a transverse duct 8, which is closed by a screw 7. At their other ends, the bores 3, 6 and 2, 4 open into bores 9, 10, which are larger in diameter, formed from the end face of the block 1 and closed by screw plugs 11. Terminal bolts 12 extend through the screw plugs 11 and carry the contact carriers 13 connected to the heater winding 5.

A terminal tag 14 for a protective ground conductor is carried by a holder plate 15, which is secured to the other end of the block by screws 16, which extend into the block. The plate 15 carries connecting pipes 18, 19, which adjoin the bores 2 and 3 with seals 17 interposed. By means of the connecting pipes 18, 19, the heater is connected, e.g., by a shut-off valve, to a water supply pipe and at the other end to an outlet or the like. A tubular strainer insert 20 preferably made of brass is threaded into the inlet pipe 18. The cross-section of each of the openings of this strainer is smaller than any construction in the flow path.

From the front face of the block, a sealed cylindrical pin 21 extends into the duct 2 and has a passage constriction 22 like a plug valve. A needle or the like may be inserted into a transverse bore 23 of this pin so that the latter may be rotated for an adjustable throttling of the flow passage and for rotating the part 21 through 180° when constriction 22 is clogged so that the foreign matter is flushed off by the water pressure.

As is apparent from FIGS. 1 and 3, a short portion of the wall at the side of bore 6 consists of a retaining pin appendage 26 of a liquid container 24. This liquid container is closed at the top by a diaphragm 25 and is filled with a liquid which boils at the desired cutoff temperature, preferably methane dichloride or ethylene dichloride. The container 24 is inserted in a recess formed in the top face of the block and the retaining pins 26 which extends from the container side opposite to the diaphragm is attached to accept a screw 27; this screw 27 extends through a transverse bore of the block. The container 24 can be removed when this screw 27 has been released. This enables, e.g., a replacement of the container 24, which forms a liquid thermostat together with the diaphragm, and air has access to the bore 6 when the container has been released so that the liquid can be drained out of the duct system of the heater, e.g., when the heater is to be put out of operation for a prolonged period or for shipment. A similar draining is enabled when the screw 7 has been released.

A diaphragm housing 28, also of insulating material, is connected by means of screws to the top of block 1 of insulating material. At its end which faces the block of insulating material, this insulating housing has a recess 29, which faces a corresponding recess 30 in the block 1 of insulating material. A gasket sheet 31 is inserted between the block 1 and the body 28 to separate the two recesses 29 and 30. A prestressed metal diaphragm 32 is provided on top of the gasket 31. The recess 29 communicates through a transverse bore 33 with that portion of the duct 3 which succeeds the constriction 22. The recess 30 is supplied with pressure through a bore portion 34, which branches from the duct 2 before constriction. The bore 33 extends through the block 1 and the body 28 adjacent to the seal 31. Above the recess 29, the insulating body is formed with a dead-end bore 35, which is intersected by a transverse cavity 36. A connector 37 is screw-threaded to the metal diaphragm 31 and is connected to one of a two-arm rocket lever 38. This one arm is mounted in the cavity 36. One end of the bore 36 is closed by a screw 39. An insert 40 is threaded into the other end of the cavity and has a lead out passage opening for the rocker lever 38. Within the cavity, the rocker lever has a collar 41, which is urged by a spring 43 against the end face of the insert 40. A seal 42 is interposed between the collar and the insert 40. The outer end of the lever 38 acts on an adjustable stop 44 of an insulating bridge 45, which cooperates by means of a further, adjustable stop 46 also with the diaphragm 25.

The insulating bridge 45 connects resilient switch contacts 47 with each other, which cooperate with countercontacts 49. The latter are secured to the top of the insulating body 28 and are inserted in recess of the body 28 and adapted to be connected by screws 48 to the supply conductors. Each contact 47 is carried by one of the contact carriers which are connected to the resistance condutor 5. When the supply of liquid is opened by a shut-off valve which precedes the connection pipe 18 and a predetermined differential pressure between the two sides of the diaphragm is exceeded, the diaphragm 32 will be deflected upwardly so that the outer arm of the lever 38 swings downwardly and the contacts 47 and 49 interengage. The liquid flowing through the heater is now being heated by the resistance conductor 5. When the differential pressure drops below the predetermined value, the diaphragm 32 returns to its inoperative position, shown in the drawing, and lifts the contact spring 47 from the counter-contacts 49. When the liquid is overheated, the liquid thermostat will respond and the diaphragm 25 will also lift the contacts 47 by means of the stop 46.

In FIG. 4, like parts are designated by the same reference characters as in the preceding figures. There are again two inlet bores. The inlet bore 2 communicates with the bore 50, which contains a resistance conductor 5. This bore 50 opens into a transverse bore 51, from which a further bore 52 extends, which contains a resistance conductor 5, which is connected to the next succeeding phase of a three-phase A.C. supply. From the end of the bore 52, the liquid enters an inlet bore 53, and from the latter into the bore 51, further into a bore 54 provided with a resistance conductor and finally into the bore 3, which leads to the outlet. The intermediate portion of the bore 51 is closed by an inserted bolt 55 and the ends are closed by screws 56, 57. The bolt serves for connecting the resistance conductors and constitutes virtually the start point of the electric system. Thus, the three contact carriers 13, 13, 13 and the star point bolt 55 effectively comprise means for connecting said coils to a source of supply so that all coils have portions that are at the same potential; and bore 51 is a connecting passage for the block which directly connects only those portions of the ducts which contain coil portions that are at the same potential and elongated inlet and outlet bores 2, 3 are conneced to ducts 50 and 52 at the ends which accommodate the ends of the coil portions which are at line potential with respect to one another.

The arrangement shown in the drawing of the switch, water flow paths and of the screws 7, 11, 26, 57 which may be used for venting and draining enables an installing of the appliance in any desired position. Other types of flow heaters can only be installed in a vertical position, which may be very difficult if the heater is to be installed below a basin or the like. When a plurality of shut-off valves are provided, such as are formed by the above mentioned screws, the provision of a central operating device for these screws or other shut-off valves is possible and may be desirable.

The only significant difference between the embodiment of FIG. 5 and that of FIG. 1 resides in that in FIG. 5 the insulating body 28 of FIG. 1 has been replaced by a disc-like insulating body 58, which is flat on one side. The spring 43 is disposed outside the insulating body to protect the spring from the corroding action of the water. Alternatively, the throttle valve 21 in the forward bore 2 may be disposed directly in a duct (not shown) which connects the two sides of the diaphragm 32. Further long resilient switch contacts 47 are mounted on insulated body 58 instead of on the resistance wire contact carriers as in FIG. 1 and the counter contacts 49 are mounted on the resistance wire contact carriers 13.

Figure 6:
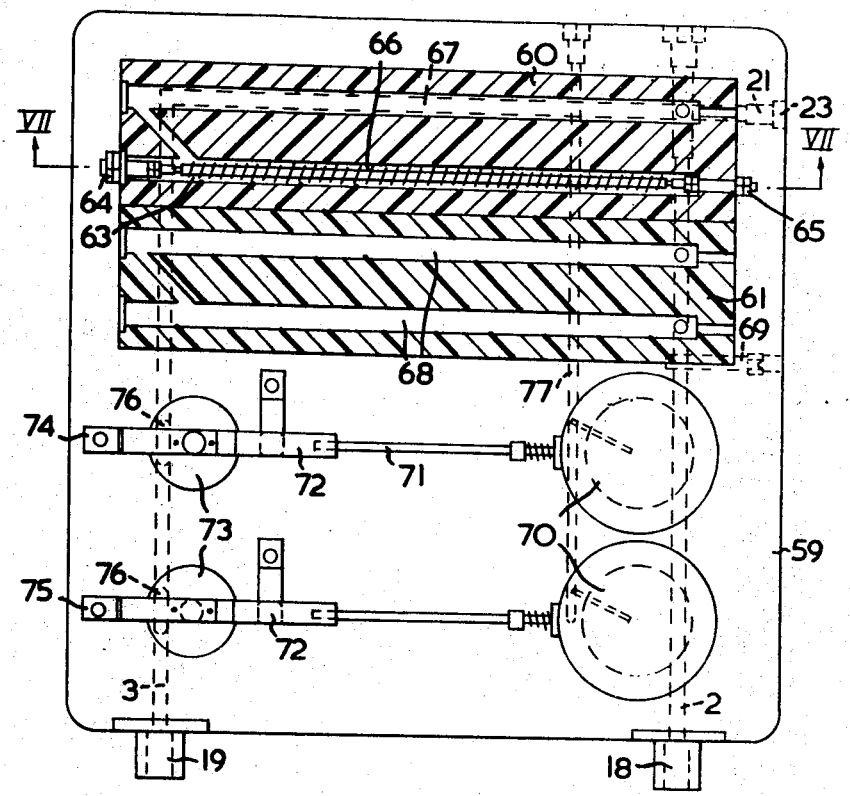
FIG. 6 is a top plan view, partly in section, showing a flow heater for high-power operation.
Figure 7:
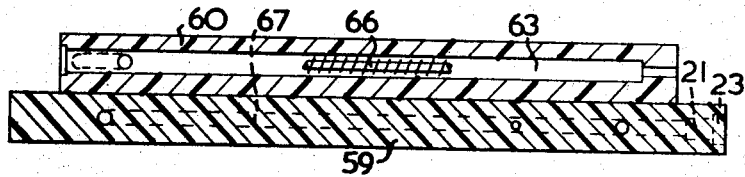
FIG. 7 is a sectional view taken on line 7—7 of FIG. 6.
Figure 8:
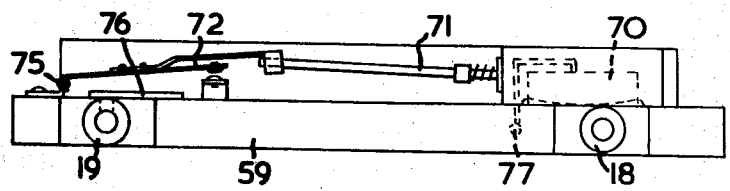
FIG. 8 is a front elevation showing the flow heater of FIG. 6.

In the embodiment shown in FIGS. 6–8, a block 59 of insulating material is again provided with inlet and outlet pipes 18, 19. Transverse bores branch from the inlet bore 2 and the throttle valve 21 extends into said transverse bores. Insulating bodies 60, 61 are placed one beside the other on top of the block of insulating material and contain resistance coils 63, which are easily replaceably held on insulating members 66 with the aid of screws 64, 65. Each of the two parts 60, 61 is in separate communication with the forward bore 2 and the outlet 3. A transverse duct 67 leading from the forward bore 2 to the outlet bore 3 is divided behind the shutoff valve 21 by the end portion of this valve. A bore which leads to the element 61, more particularly to the flow ducts of this element, which are also provided with resistance coils, not shown, may contain a valve 69, which does not open until a predetermined pressure has been exceeded.

Each of the two elements 60, 61 has associated with a control system 74 or 75, which comprises a diaphragm 70 a switch linkage 71, a switch 72 and a temperature-responsive control element 73. The temperature feelers 76 of the temperature-responsive control elements are supplied with liquid from the outlet bore 3. One side of the diaphragm 70 is permanently supplied with liquid from the inlet bore 2. The other side of the diaphragm is supplied with liquid from a separate control bore 77. The diaphragms 70 of the two control systems 74, 75 are set to different threshold pressures. When water is supplied at a lower rate through the bore 2, only the switch 72 of the switch set 74 energizes the resistance coils of part 60 by means of a control relay, the control circuit of which is connected to the switch contacts. A supply of water at a higher rate results in a response of the diaphragm 70 of the control system 75 in the circuit-closing sense so that the resistance coils of part 61 are additionally connected into the circuit so that the power corresponds to the increased heat requirement. The shut-off valve 69 may be opened before the resistance coils of part 61 are energized.

It is recommendable to set also the two liquid thermostats 73 of the control systems 74, 75 to different threshold temperatures so that the resistance coils of part 61 are disconnected when a predetermined temperature limit has been exceeded. Only when a higher temperature limit has been exceeded does the thermostat 76 of the control system 74 effect a disconnection of the resistance coils of part 60 by means of the associated contactor or the like. The arrangement may be simplified by the provision of a common thermostat 73, which acts on the switch of both switch sets.

The modification which has been described may be further developed. For instance, different heater cartridge sets having different power ratings may be connected to the water connections of part 59, which connections are provided for the elements 60, 61, or further heater cartridges may be built up on top of parts 60, 61. Separate switch sets for such further cartridges may be provided on the block of insulating material or on the elements mounted thereon.

Thus, flow heaters having different power ratings and for different types of current can be assembled from prefabricated elements comprising a block of insulating material, uniform switch sets and uniform or different heater cartridges 60, 61.

It is emphasized that the invention is not restricted to flow heaters provided with bare resistance conductors but may also be realized with tubular heaters (heaters rods). Besides, the switches need not consist of push-button switches but may comprise tiltable mercury switches for a direct control. Pressure- or temperature-responsive resistors, which may be actuated, e.g., by the diaphragms 70 or are in heat-conducting connection with the liquid, may be used for controlling particularly when the direct power control of the resistance coils is effected by contactors or the like, as illustrated in FIG. 10 at 86.

Figure 9:
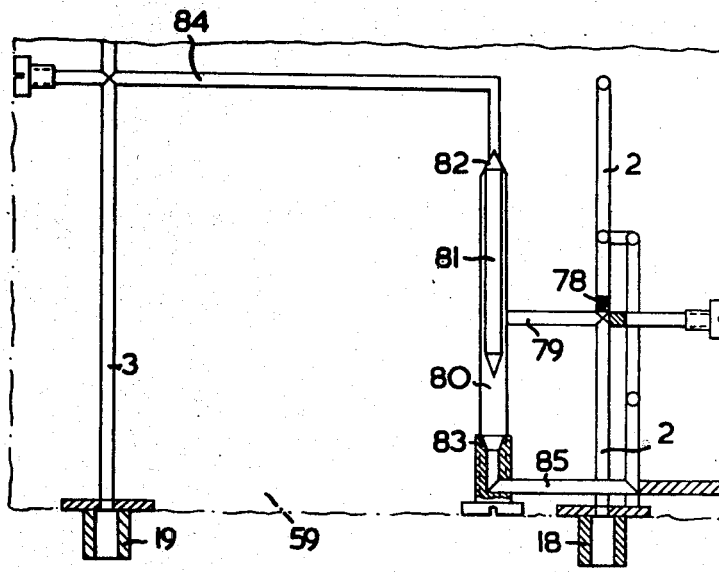
FIG. 9 shows a modification of the inlet portion of a flow heater of FIG. 6, partly in section.

To prevent an energization of the resistance coils when the required operating conditions do not exist, a control arrangement according to FIG. 9, which is intended for flow heaters to be installed in a vertical position, may be used. In this embodiment, the inlet bore 2, which subsequently leads to the resistance coils, is interrupted by an inserted plug 78. A transverse bore 79 leads to a longitudinal cavity 80, which accommodates a control member consisting, e.g., of a float 81. The cavity 80 has two outlets 82, 83, one of which leads to a duct 84 communicating directly with the outlet bore 3. The other of said ducts leads to a duct 85, which by-passes the plug 78 and opens in the inlet bore 2. Pure water supplied through 2 will lift the float 81 to close the outlet 82 so that the water flows through 83, 85 and the continuation of 2 to the control diaphragms and through the ducts to the resistance coils. Any occluded air in the supply pipe will cause the float 81 to drop, so that 82 is opened and 83 is closed. The air can now escape directly through 3. The closing of the outlet 83 relieves the pressure from the control diaphragms so that the resistance coils are disconnected.

FIG. 10 illustrates how a contactor indicated generally as 86 may affect the direct power control of the energization of resistance element 5 by the pilot switch 47, 49 controlling the contactor. The bridge contact 47 engages contact 49 as on FIG. 1 so that low value of current flows from the power supply through coil 89. Energization of coil 89 closes power contacts 87 and 88 thus supplying high current power to the electrical resistance element 5.

I claim:
1. An electric flow heater which comprises a block of insulating material formed with ducts constituting a flow passage through said block, said flow passage having an intermediate constriction, electric resistance means contained in said flow passage so as to permit a flow of liquid through said passage, a switch carried by said block and serving to control the energisation of said electrical resistance, said block being formed with a recess, a diaphragm housing formed of insulating material, detachably secured to said block and formed with a recess facing said recess in said block, a diaphragm disposed between said two recesses, said switch comprising contacts carried by said diaphragm housing, means providing communication between one side of the diaphragm and said flow passage on one side of said restriction including a cavity in said diaphragm housing, means providing communication between the other side of said diaphragm and said flow passage on the other side of said constriction, a two armed rocker lever extending laterally out of said diaphragm housing and operatively connecting said diaphragm to said switch, said lever having a shorter arm connected to said diaphragm and contained in said cavity, said diaphragm housing having a circular lead out passage for said lever, said lead out passage opening into said cavity, said lever having a collar contained in said cavity, said collar being larger in diameter than said lead out passge, a seal interposed between said collar and the wall of said diaphragm housing surrounding the inner end of said passage, a spring in said cavity urging said collar against said wall so as to seal said lead out passage, a gasket interposed between said block and said diaphragm housing, means forcing said block and said diaphragm housing together, said means providing communication between one side of said diaphragm and said flow passage on one side of said restriction comprising, in addition to said cavity, a passage extending therefrom through said diaphragm housing, gasket and block into said flow passage, and a temperature responsive control element responsive to the temperature of the liquid in said flow passage and operatively connected to said switch independently of said diaphragm, said temperature responsive control element comprising a liquid thermostat including a heat responsive liquid, said heat responsive liquid being in heat conducting connection with the liquid in said passage.

2. An electric flow heater which comprises a block of insulating material formed with ducts constituting a flow passage through said block, said flow passage having an intermediate constriction, electrical resistance means contained in said flow passage so as to permit a flow of liquid through said passage, a switch carried by said block and serving to control the energisation of said electrical resistance, said block being formed with a recess, a diaphragm housing formed of insulating material detachably secured on the top, said block leaving part of the top of said block uncovered, the diaphragm housing being formed with a recess facing said recess in said block, a diaphragm disposed between said two recesses, said switch comprising fixed counter-contacts carried by said diaphragm housing, and resilient movable counter contacts arranged over said uncovered part and adapted to contact said counter-contacts and an insulating bridge connecting said movable contacts, means providing communication between one side of said diaphragm and said flow passage on one side of said constriction means providing communication between the other side of said diaphragm and said flow passage on the other side of said constriction, a two armed rocker lever extending laterally out of said diaphragm housing, a temperature responsive control element which is responsive to the temperature of the liquid in said flow passage, said temperature responsive control element comprising a liquid thermostat including a heat responsive liquid, said heat responsive liquid being in heat conducting connection with the liquid in said passage and adjustable stops connecting said rocker lever and said control element to said insulating bridge, said rocker lever and said control element each being adapted to independently lift said movable contacts from said counter-contacts by means of said insulating bridge.

3. A flow heater as defined in claim 2 and further comprising a contactor means for directly controlling the energisation of said electric resistance means, and circuitry for controlling said contactor means, said circuitry including said switch as a pilot switch.

4. A flow heater as set forth in claim 2, in which said block is formed with a plurality of ducts, each of which accommodates part of said electric resistance means in the form of bare resistance coils, said heater comprises means for connecting said coils to a source of supply so that all coils have portions that are at the same potential, said block being formed with connecting passages which directly connect only those portions of said ducts which contain said coil portions that are at the same potential when said coils are thus connected, and elongated inlet bores are formed in said block and connect portions of said ducts which contain portions of said coil that are at different potentials when said coils are thus connected.

5. A flow heater as set forth in claim 2, in which said flow passage comprises, in series, a liquid inlet, a valve chamber, a passage portion containing said electric resistance means, and an outlet, and said valve chamber has a first port connected to said passage portion and a second port directly connected to said outlet, and which comprises a valve contained in said valve chamber and serving to control said ports, said valve being arranged to be normally in a position in which said first port is closed and said second port is open, and being movable in response to liquid pressure in said inlet to a position in which said first port is open and said second port is closed.

References Cited

UNITED STATES PATENTS

| | | | |
|---|---|---|---|
| 1,194,886 | 8/1916 | Simon | 219—308 |
| 1,554,502 | 9/1925 | Hulse | 219—309 X |
| 2,791,671 | 5/1957 | Price | 219—309 |
| 3,052,776 | 9/1962 | Schomann | 200—81.9 |
| 2,973,424 | 2/1961 | Schomann | 219—309 |
| 3,088,017 | 4/1963 | Schomann | 219—309 X |
| 3,209,126 | 9/1965 | Elias | 219—309 |

FOREIGN PATENTS

| | | |
|---|---|---|
| 876,825 | 9/1961 | Great Britain. |

ANTHONY BARTIS, Primary Examiner

U.S. Cl. X.R.

200—81.9; 219—307, 331, 332, 496, 508